A. BÜCHI.
MARINE ENGINE INSTALLATION.
APPLICATION FILED OCT. 22, 1912.
1,138,077.
Patented May 4, 1915.
3 SHEETS—SHEET 1.
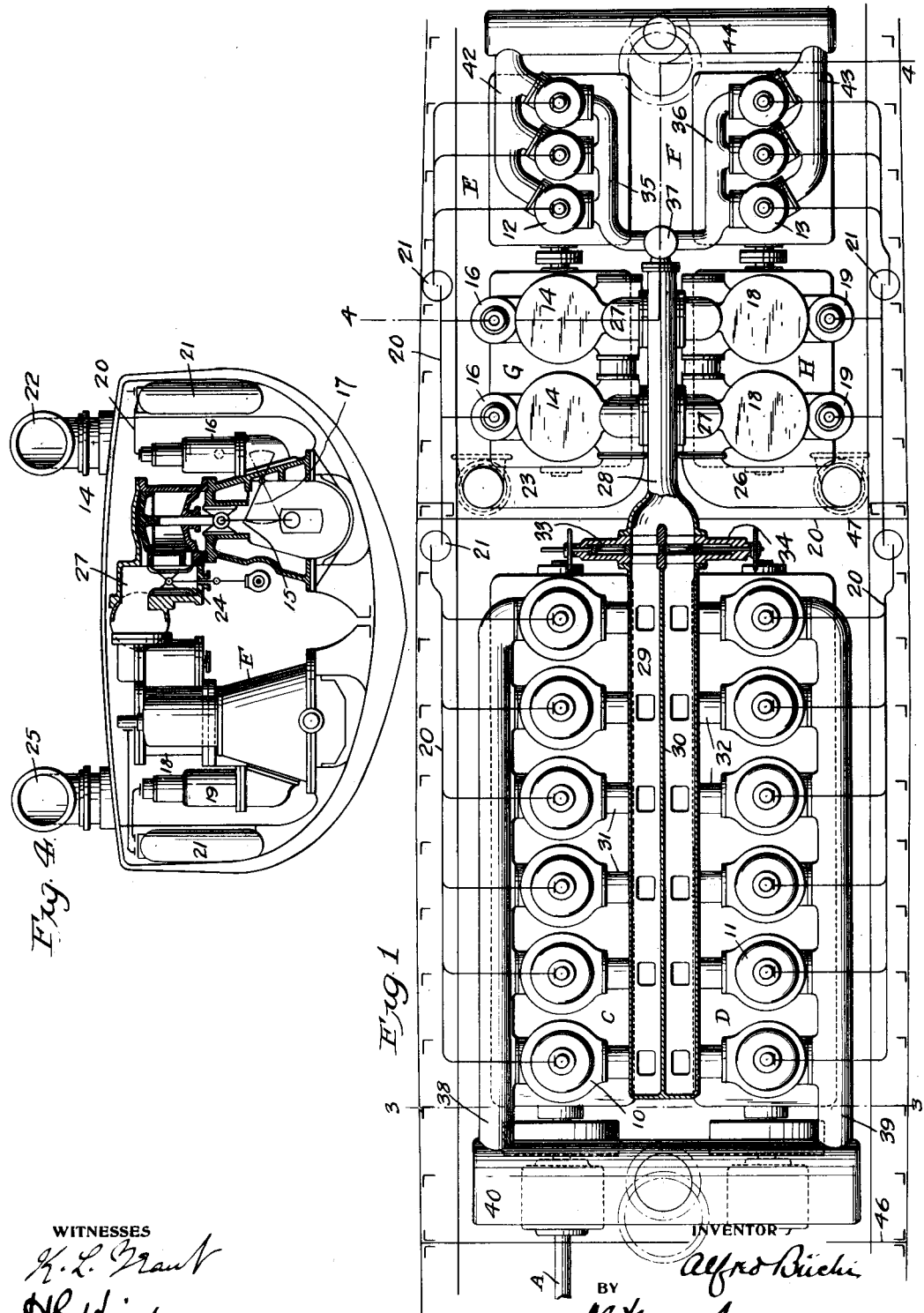
WITNESSES
INVENTOR
Alfred Büchi
BY
ATTORNEY

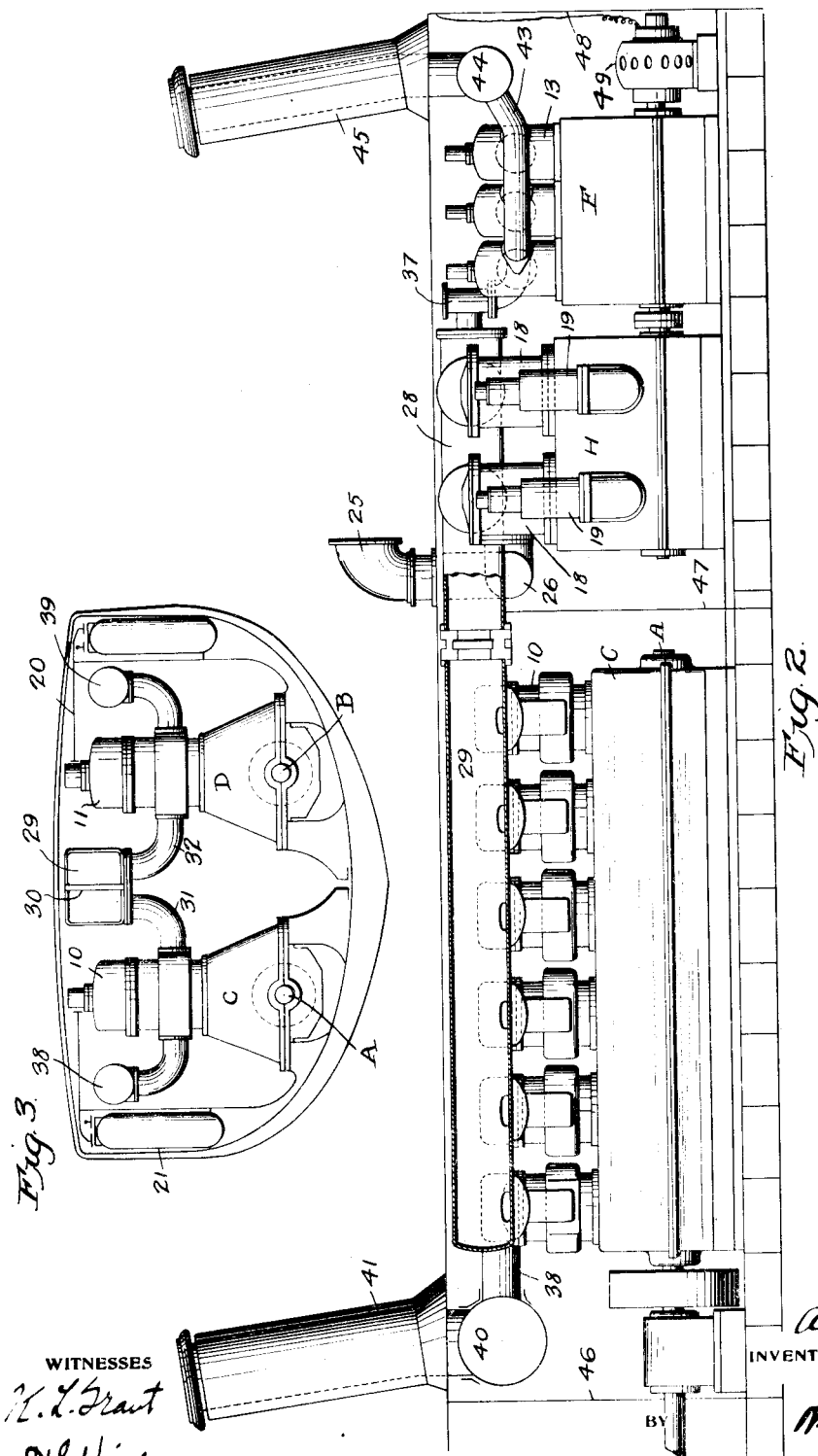

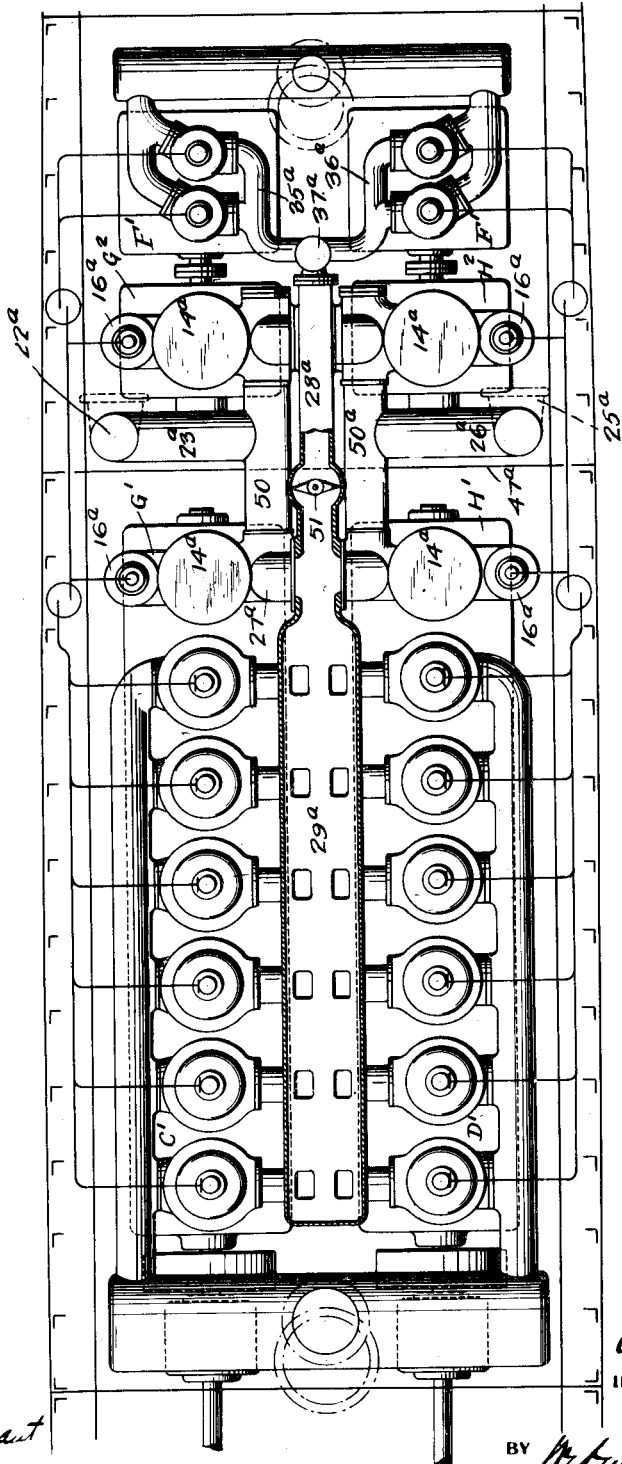

UNITED STATES PATENT OFFICE.

ALFRED BÜCHI, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

MARINE-ENGINE INSTALLATION.

1,138,077.      Specification of Letters Patent.      Patented May 4, 1915.

Application filed October 22, 1912. Serial No. 727,119.

*To all whom it may concern:*

Be it known that I, ALFRED BÜCHI, engineer, a citizen of the Republic of Switzerland, residing at Winterthur, Canton of Zurich, Switzerland, have invented certain new and useful Improvements in Marine-Engine Installations, of which the following is a full, true, and complete specification.

This invention consists in certain improvements in the combination and arrangement of parts in a Diesel engine power plant, more especially for ship installation.

The object is to combine the air pumps serving a plurality of power groups and to locate them in the most advantageous manner with respect thereto, to provide a common scavenging air distribution system together with controlling means, whereby the pressures delivered to the power groups may be equalized or whereby the air may be supplied in any desired relative proportions and pressures to, or entirely cut off from, different parts of the system, according to the needs, to improve and simplify the structural features of the distribution system, to provide direct routes for the scavenging air from the region where compressed to the places where used, to combine and simplify the provisions for conducting away the exhaust gases, and, furthermore, to secure these and other advantages in a symmetrically arranged power plant especially adapted to the exigencies of ship installations and for the economical and advantageous utilization of available space.

As herein illustrated the invention is applicable more especially to twin screw ships.

In the accompanying drawings illustrating the invention: Figure 1 is a plan view, parts being in section and the high pressure air distribution system being indicated diagrammatically; Fig. 2 is a sectional side elevation; Fig. 3 is a sectional elevation on the line 3—3 of Fig. 1; Fig. 4 is a sectional elevation on the line 4—4, of Fig. 1; and Fig. 5 is a plan view, with parts in section, illustrating another embodiment of the invention.

In Figs. 1 to 4, A and B indicate two propeller shafts, and C and D are two two-cycle Diesel or other constant pressure internal combustion engines for driving the same, their cylinders being disposed vertically and their crank shafts suitably coupled with the propeller shafts. Engine C is shown as comprising six power cylinders 10 and engine D as having the same number of power cylinders 11. The two engines are thus in parallelism and at a distance from each other determined by the distance between the propeller shafts. Auxiliary engines E and F are likewise disposed longitudinally of the vessel, in parallelism to each other and at opposite sides of the longitudinal center of the vessel. Both of the auxiliary engines are located forwardly of the vessel with respect to the main engines. Engine E is preferably in line with engine C, and engine F in line with engine D. Engine E is shown as comprising three power cylinders 12 and engine F as having the same number of power cylinders 13. These auxiliary engines drive the two groups of air pumps G and H, which are located between the main and auxiliary engines and are likewise at opposite sides of the longitudinal center line of the vessel. The group G comprises two low pressure or scavenging pumps 14, the pistons of which are driven by connecting rods 15 from the crank shaft as shown in Fig. 4, and two two-stage high pressure pumps or compressors 16 at their outer sides, the pistons of these pumps being connected with the connecting rods 15 by rock levers 17. Similarly pump group H comprises low pressure pumps 18 and high pressure pumps 19.

The low pressure pumps supply the air for scavenging the power cylinders and for compression therein to the degree requisite to produce sufficient heat to ignite the fuel injected into it by the high pressure air. The high pressure pumps supply this high pressure or fuel air; and the high pressure air is also used for starting and reversing the engines, and for any other purposes that may be desired. The high pressure system is shown diagrammatically, the lines being designated 20 and the storage and equalizing reservoirs or flasks being marked 21. The pumps are of such capacity as to supply sufficient air, both of low and high pressure, for all of the engines up to the maximum loads determined upon.

The low pressure or scavenging pumps 14 have a common intake 22 above deck and a common conduit 23 leading therefrom and in communication with both of their valve chests 24. In like manner the scavenging pumps 18 have a common intake and conduit 25, 26. The compressors 16 and 19, it will be understood, compress air taken from the low pressure pumps, so that the pumps are in effect three-stage compressors. The discharge passages 27 of all the scavenging pumps deliver by preference into a common longitudinal conduit or receiver 28 located between the two groups of pumps. At one end this conduit communicates with a common manifold 29 in line with it and centrally between the main engines C, D or their vertical projections. In this instance this common manifold is divided internally by a central longitudinal partition 30, which extends to the flared end of the conduit 28, which constitutes a connection between the two sides of the manifold. The manifold is connected with the power cylinders of the main engines by two sets of branches 31, 32. Suitable valves 33, 34 control the entrances to the two halves of the manifold and enable the scavenging and compression air to be delivered to the two main engines in any relative pressure or quantities. With the valves open the pressures are equalized. At its opposite end the conduit 28 communicates with two scavenging manifolds 35, 36, one for each of the auxiliary engines and at the inner sides thereof. The flow to these manifolds may be regulated or cut off by a suitable valve or valves indicated at 37. All of the conduits and manifolds of the scavenging air distribution system are located overhead at a suitable height.

The exhaust gases from the main engines pass into longitudinal exhaust manifolds 38, 39 located at their outer sides. These manifolds extend aft and deliver into a common transverse header 40, from the center of which the gases pass upward to the stack 41. The auxiliary engines have exhaust manifolds 42, 43 similarly located with respect to the engines, but extending forward and delivering into another transverse header 44, from which the gases pass upward to the stack 45.

The main engines are isolated in a watertight compartment of which 46 and 47 are the front and back transverse walls, and the auxiliary engines and the pumps are in another water-tight compartment, having the front and back walls 48 and 47. Two of the high pressure flasks 21 are in each compartment, one at each side. The auxiliary engines besides driving the pumps may serve for any other duty. In Fig. 2 one of them is shown driving a dynamo 49.

In Fig. 5 the pumps are driven in part by the main engines $C^1$ and $D^1$ and in part by the auxiliary engines $E^1$ and $F^1$, and the division wall $47^a$ between the two compartments passes between the two parts of the pump installation, but they are combined as to their air supply and as to their discharge. The scavenging manifold $29^a$ of the main engines is located as in the other instance but has no longitudinal partition. The pumps as before are located between the main and auxiliary engines. The main engines drive pumps $G^1$ and $H^1$, each of which consists of a low pressure pump or stage $14^a$ and a two-stage high pressure pump $16^a$ arranged and connected as before. These pumps are preferably built as parts of the engines and they are of such capacity as to supply the main engines with scavenging and fuel air up to a certain predetermined load, beyond which the main engines draw upon the pumps $G^2$ and $H^2$ driven by the auxiliary engines and comprising the same parts as the others. The pumps $G^1$, $G^2$ draw their air through an intake $22^a$ and a conduit $23^{a}$ which delivers through the side of a conduit 50 extending longitudinally and communicating at its opposite ends with their valve chests. At the other side there is a similar intake $25^a$ and conduits $26^a$ and $50^a$. The discharge connections $27^a$ of all four scavenging pumps deliver into a common central longitudinal conduit $28^a$, which at one end communicates with the end of the manifold $29^a$ and at the other end with the manifolds $35^a$, $36^a$ of the auxiliary engines. A valve or valves $37^a$ enables the air supplied to the auxiliary engines to be regulated or cut off; and a valve 51 in the conduits $28^a$ provides means for cutting off or controlling the communication between the discharge sides of the pumps of the main engines and those driven by the auxiliary engines. Thus the main engines may be supplied by their own pumps entirely independently of the auxiliary engines, and similarly with the auxiliary engines.

Other features are similar to those described in connection with the other views.

What is claimed as new is:

1. In a power plant, the combination of Diesel engines arranged in parallelism at opposite sides of a longitudinal center line, there being two engines at each side of the center line spaced from each other longitudinally, air pumps located in the spaces between the engines at each side of the center line, and a common scavenging air distribution system supplied by said pumps and arranged between the two proximate sides of the power plant.

2. In a marine power plant, the combination of a pair of propeller-driving Diesel engines arranged in parallelism, a pair of auxiliary Diesel engines likewise arranged in parallelism and spaced longitudinally from the propeller-driving engines, air pumps located between the main and auxiliary engines at each side, a common scavenging air distribution system supplied by said pumps and delivering to the various engines, and means for relatively controlling the supplies delivered to the propeller driving engines and to the auxiliary engines.

3. In a ship, the combination of a pair of propeller-driving Diesel engines disposed longitudinally and in parallelism, a pair of auxiliary Diesel engines likewise disposed longitudinally and in parallelism and spaced from the main engines, air pumps located between the main and auxiliary engines at each side for supplying both of them, a common receiver into which the pumps at opposite sides discharge their low pressure air, a common scavenging manifold communicating with one end of said receiver and extending longitudinally between said main engines, and connections between the other end of the receiver and the auxiliary engines.

4. In a ship, the combination of two longitudinally disposed parallel multiple cylinder Diesel engines, a common scavenging manifold disposed longitudinally between them, exhaust manifolds at their outer sides, and a common transverse header having connection with the stack and with the discharge ends of said exhaust manifolds.

5. In a marine power plant, the combination of a pair of main Diesel engines arranged in parallelism, a pair of auxiliary Diesel engines likewise arranged in parallelism and spaced longitudinally from the main engines, air pumps located between the main and auxiliary engines, part of the pumps being adapted to be driven by the main engines and part by the auxiliary engines, and a common distribution system which connects with both the main and the auxiliary engines and is supplied by the pumps of both the main and the auxiliary engines.

6. In a marine power plant, the combination of a pair of main Diesel engines arranged in parallelism, a pair of auxiliary Diesel engines likewise arranged in parallelism and spaced longitudinally from the main engines, air pumps located between the main and auxiliary engines, part of the pumps being adapted to be driven by the main engines and part by the auxiliary engines, a common distribution system which connects with both the main and the auxiliary engines and is supplied by the pumps of both the main and the auxiliary engines, and means for controlling the communication between the part of the distribution system supplied by the pumps of the main engines and the part supplied by the pumps of the auxiliary engines.

In testimony whereof, I have signed this specification in the presence of two witnesses.

ALFRED BÜCHI.

Witnesses:
 CARL SUASER,
 AUGUST RUEGG.